United States Patent [19]

Gibbons

[11] 4,442,872

[45] Apr. 17, 1984

[54] APPARATUS AND METHOD FOR THE PRODUCTION OF WIRING LOOMS

[75] Inventor: Ralph D. Gibbons, Basingstoke, England

[73] Assignee: Lansing Bagnall Limited, Hampshire, England

[21] Appl. No.: 303,502

[22] Filed: Sep. 18, 1981

Related U.S. Application Data

[63] Continuation-in-part of Ser. No. 56,730, Jul. 11, 1979, abandoned.

[30] Foreign Application Priority Data

Jul. 17, 1978 [GB] United Kingdom ............... 30134/78
Mar. 25, 1981 [GB] United Kingdom ................ 8109431

[51] Int. Cl.$^3$ ................................................ B21F 3/00
[52] U.S. Cl. .................................. 140/92.1; 140/93 R
[58] Field of Search ........................... 140/92.1, 93 R; 29/56.5, 56.6, 850; 179/98

[56] References Cited

U.S. PATENT DOCUMENTS 3,346,020 10/1967 Geisinger ........................... 140/92.1
3,633,096 1/1972 Bollman ............................. 140/92.1
4,090,537 5/1978 Bollman ............................. 140/92.1

Primary Examiner—Francis S. Husar
Assistant Examiner—Linda McLaughlin

Attorney, Agent, or Firm—Cushman, Darby & Cushman

[57] ABSTRACT

A wiring loom includes a multiplicity of shouldered pins and a table for receiving and releasably holding the pins in position to define paths for a wiring harness. The table includes a mesh which allows ends of the pins to pass and enter a resilient penetrable layer below the mesh. The mesh cooperates with the pins to prevent complete passage of the pins through it. Wires are held by injecting the leading end of a wire into the mesh, looping the wire around a start pin and then laying the wire along paths defined between pairs of pins. The wire may finely be looped around a terminating pin. Collars may be disposed over the pins to provide a platform for the wire. In a preferred form there is a further light nylon mesh above the first mesh. The pins can pass through this light mesh. When a wiring harness is completed, the light mesh is raised to free the harness from the pins and the table is inverted so that the harness falls onto a conveyor. The table is then ready to receive the wires of a subsequent, identical harness. When a production run of harnesses is completed, the first mesh is separated from the resilient penetrable layer so as to free the pins from the latter layer. Inversion of the table causes the pins to fall onto a conveyor. Reinversion of the table makes it ready to receive a new pattern of pins.

25 Claims, 6 Drawing Figures

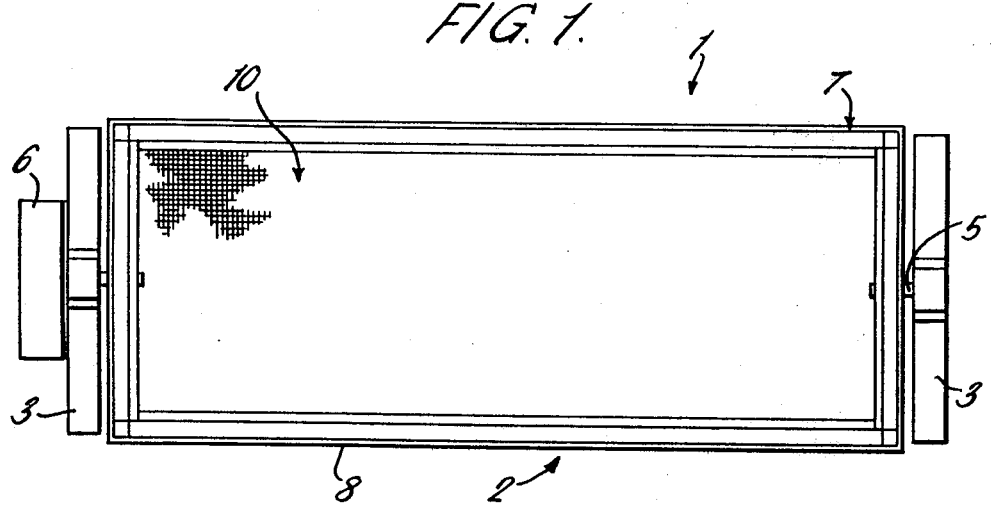
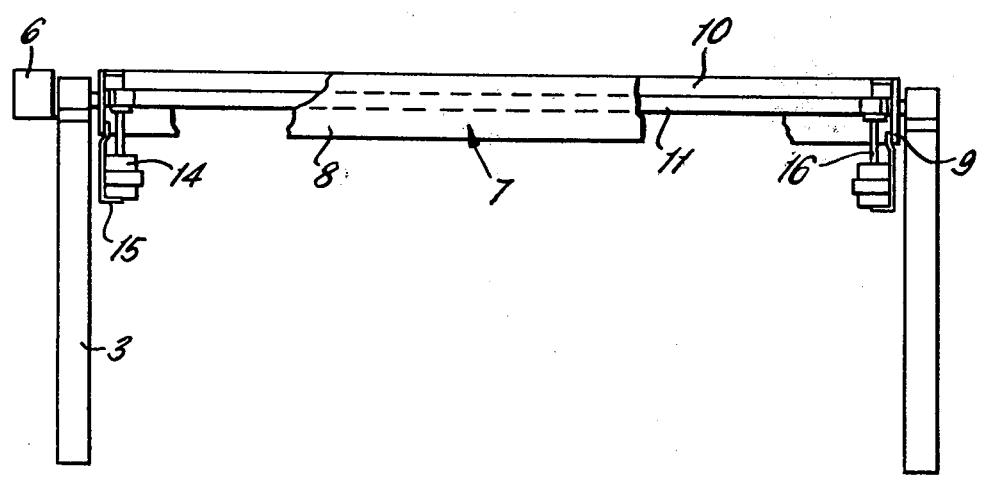

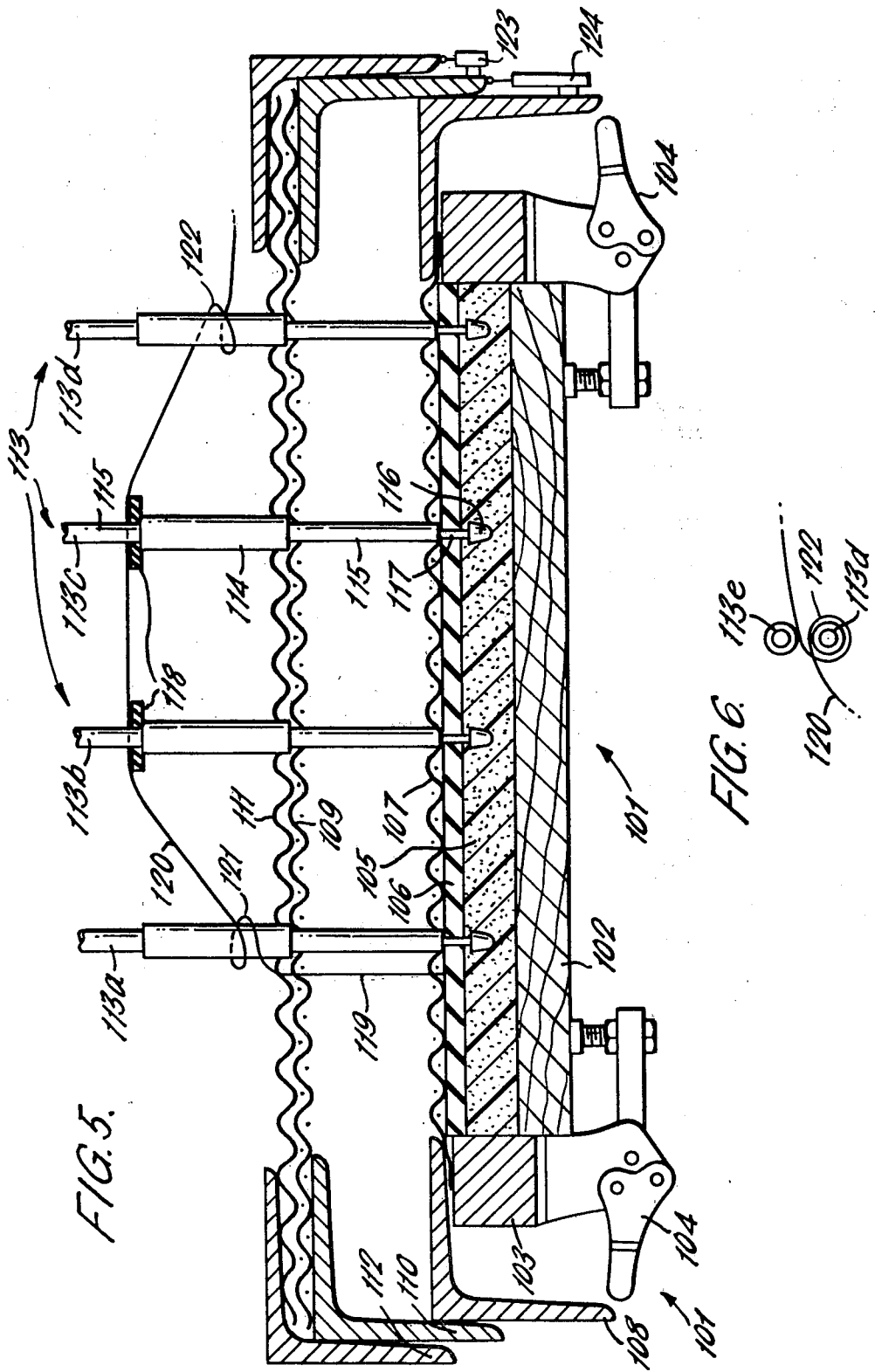

APPARATUS AND METHOD FOR THE PRODUCTION OF WIRING LOOMS

CROSS REFERENCE TO RELATED APPLICATION

This application is a Continuation-in-Part of my prior co-pending application Ser. No. 56,730 entitled "Apparatus for use in the production of wiring looms" filed July 11th, 1979 and now abandoned.

BACKGROUND OF THE INVENTION

This invention relates to apparatus for use in the production of wiring harnesses or cable forms and in particular to improved loom tables and more particularly to a loom table having a construction to facilitate the releasable attachment of guide pins. The invention also relates to the production of a multiplicity of similar wiring harnesses in a production run comprising a multiplicity of cycles in each of which a wiring harness is produced and to that end the invention concerns the use of the improved forms of loom table as specified above.

As is well known to those skilled in the art a wiring harness is an assembly of wires bound or otherwise held together as a bundle for providing the required electrical connection between various electrical components in a piece of equipment. Such harnesses are extensively used in the manufacture of domestic and industrial powered vehicles, such as automobiles, lorries and industrial trucks which include a large number of such electrical components. When the wiring harness is disposed in the vehicle, it is commonly disposed in a channel or channels or is otherwise fixed to the frame of the vehicle, the various wires of the harness being individually identified by colour coding and extending between switches, power sources, lighting equipment, engine or motor components, fuses, steering gear or other components of the vehicle.

It will be appreciated that the different components and relative disposition thereof in different vehicles requires that harnesses be specially designed for the particular vehicle concerned. It has been common practice in the past to lay wire lengths along predetermined paths marked on a board and defined by a multiplicity of pins held in and projecting from the board, serving to hold wires in place until all of the wires are laid. It has been common practice to provide a different loom board for each different type of wiring harness which is to be produced but such a practice requires the production of a large stock of loom boards and is thereby rather inconvenient. Although, as noted below, it has been proposed to provide a loom board or table which can accommodate releasable pins, prior loom tables have not been particularly well adapted for the insertion and removal of guide pins, as for example by means of an automatic manipulator, so that the wiring paths defined by a particular pattern of pins can readily be changed for the production of a different harness.

One object of the present invention is therefore to provide a loom table which is well adapted for the easy insertion and removal of guide pins, particularly by means of an automatic manipulator used for that purpose.

In the laying of wires to form a wiring harness it has been common practice to use equipment commonly known as an X-Y plotter which for any selected wire draws the wire from a spool or other supply along the path defined, for example, by guide pins. In practice it has been necessary to employ special devices for terminating the ends of wires so as to secure them in position on the loom table while the remaining wires of the harness are laid. Such expedients are generally inconvenient either because they require additional equipment for attaching terminal fittings or other anchorages to the wires or because they require the disposition of special wire holders on the wiring table itself.

It is therefore another object of the present invention to provide a loom table by means of which ends of wires can be conveniently anchored in any desired position without requiring the use of tools other than those for laying or cutting the wire and without requiring the fitment of wire holders (other than the aforementioned guide pins) to the table.

A further object of the present invention is to provide an improved method of producing wiring harnesses which is well adapted for automatic performance and which can be performed by an automatic manipulator in conjunction with a loom table as set forth herein.

A further object of the invention is to provide apparatus for use in the production of wiring looms particularly adapted for use in conjunction with shouldered guide pins and in which apparatus the loom table itself is adapted for holding the ends of wires laid on the table without requiring any special clips or fitments for the ends of the wires.

SUMMARY OF THE PRIOR ART

As foreshadowed hereinbefore, there are two broad aspects to the prior art, namely the construction of a loom table itself and methods of laying and fixing wires on the table.

As indicated in the foregoing, the commonplace form of loom table merely consisted of a board into which guide pins could be hammered or otherwise fixed to define a wiring pattern. A typical example of this kind of board, actually used in conjunction with an X-Y plotter, is provided by U.S. Pat. No. 4,030,527 to Roch filed June 21st, 1976. In that apparatus there is an array of individual spools each including a tensioning device and including a plurality of individual capstan pulleys each receiving an individual wire from one of the spools and with a single capstan drive for engaging one capstan pulley at a time for individually feeding the plurality of wires from the spools. The wires pass to a plurality of individual clamps for clamping the plurality of individual wires except the wire fed from the capstan pulley actually engaged by the capstan drive and with a wire feed mechanism intermediate the capstan drive and the clamps feeding the wires to a single wire head. The head is coupled to an X-Y positioner for receiving the wire fed from the capstan pulley engaged by the capstan drive for laying the wire in a predetermined pattern which is defined by pins on a form board; there is a pattern of pins individual to each wire. Initially each wire is wrapped around one of the pins after it has been clamped in a wire bar clamp assembly. The form board contains individual clamps either in addition to or in place of the one bar clamp assembly to clamp the wire before it is laid in the predetermined pattern. In such an arrangement a form board and clamps must be provided for each type of harness which is to be produced and it is thereby necessary to provide a large stock of form boards and clamps if a large number of different types of harness is to be produced.

U.S. Pat. No. 3,346,020 (Geisinger) discloses an arrangement in which pins are screwed to a base board in positions defining the paths of the wires constituting each harness. This arrangement is better than an ordinary form board because it is proposed that the pins extend upwardly through two meshes. These meshes are fixed relative to each other but can be moved as a unit vertically with respect to the form board so that a wiring harness which is laid by means of the pins can be removed from the pins by a vertical movement of the two meshes. However, the arrangement is still not particularly convenient, first because the requirement to screw in the guide pins restricts the versatility of the loom board; in practice it is inconvenient to unscrew all the pins and rescrew them in new positions for a new wiring pattern. Moreover, Geisinger requires the use of special connectors for anchoring the ends of the wires on the board.

As will be apparent hereinafter, one subsidiary aspect of the present invention is the ability to remove guide pins from the board by a two-stage process of which one is constituted by inverting the board so that guide pins can fall onto a conveyor. Although tilting worktables and form boards are known, as shown for example by Bollman in U.S. Pat. No. 4,090,537 filed Feb. 16th, 1977, Bollman does not disclose the inversion of a form board to assist in the removal of guide pins therefrom.

As regards methods of laying wires and fixing them to a loom table, there exists in the prior art a large number of proposals, mostly using X-Y plotters and generally using special clips or fitments for the ends of the wires. For example, the patent to Vickery U.S. Pat. No. 3,186,077 filed July 9th, 1963 discloses an arrangement in which a loom board is provided with a multiplicity of terminal posts and the ends of an individual wire are attached to respective terminal posts by means of a clip which is fastened to the respective terminal post by a clip pusher operating in association with a cutter for the wire. The arrangement is mechanically rather complicated and requires the feeding of wire by means of a wire nozzle or guide through which the wire is fed and which is shiftable in synchronism with the movements of the clip pusher and cutter.

The patent to Tarbox et al U.S. Pat. No. 3,699,630 filed Dec. 31st, 1970 discloses an X-Y plotter which is used in conjunction with special wire termination sites on the form boards. The termination sites each comprise a block in the form of a metal plate which is secured to the base board to firmly and uniformly seat an area of a layer of resilient material which has an array of openings to provide grip holes. The need to provide these termination devices severely restricts the versatility of the machine and, of course, the form board has to be specially prepared with the termination blocks thereon. It is, by virtue of the provision of the termination blocks, not readily possible to release the wiring harness from the board by any simple movement.

The patent to Mercer U.S. Pat. No. 3,842,496 filed Feb. 18th, 1972 discloses an arrangement in which a machine applies identifying indicia to several portions of a continuous wire and marks the termination of each of the wire portions in a predetermined sequence along the continuous wire. After the wire is respooled it is placed in a numerically controlled laying machine which lays down the individual wires in a predetermined sequence. The machine severs the continuous wire to produce individual wires as they are laid on the wiring loom base. The loom board includes means defining gripping apertures for holding the ends of the wires. These means are provided by elastomeric slitted sheets which are screwed to the loom board. The loom boards are not readily changeable and it is necessary, particularly for larger harnesses, to prepare different form boards for each harness assembly.

Various other references which illustrate the general state of the art but which are less relevant than the foregoing to the construction of the invented loom table and preferred methods of using it are U.S. Pat. Nos. 3,143,306 and 4,126,935 which show various methods of wiring, U.S. Pat. No. 4,058,215 (Marchbank) which discloses the use of rigid backing boards, U.S. Pat. No. 3,633,096 which shows wiring pins pressed into a laminate comprising wire mesh screens and intervening layers of foam rubber, which layers are not relatively separable, U.S. Pat. Nos. 3,612,369, 3,961,703 and 4,024,630, which disclose various forms of wiring tools and terminal connectors, U.S. Pat. No. 3,961,703 which concerns a device handling and bundling lengths of insulated wire after performing various operations thereon, U.S. Pat. No. 3,186,077 which describes an apparatus for wiring panel boards rather than electrical harnesses, British Patent Specification No. 1,493,532 which discloses another form of X-Y plotter, British Specification No. 1,463,828 which concerns a method of manufacturing harnesses using special jigs for securing the ends of the wires and the use of particular terminal connectors in conjunction with the jigs, and U.S. Pat. No. 3,435,858 (Taysom et al) which describes an automatic wiring machine having multiple head units capable of wire wrapping, wire feeding and wire bending operations but is otherwise of no particular relevance. The vast majority of these specifications, which are believed to represent fairly the state of the art, are not believed to be relevant to the construction of the invented loom table or to preferred methods of using it.

SUMMARY OF THE INVENTION

As mentioned hereinbefore, the production of a wiring harness requires the provision of a wiring board or loom table which can hold a multiplicity of guide pins. One aspect of the present invention, but not intended to be a limitation on the construction of the loom table per se, is the use of an automatic manipulator or robot for the laying of wires and the positioning of guide pins at selected locations in the table. In general, wires in each harness start and terminate at different positions on the wiring table or loom board but are laid along paths which for part of their length are adjacent each other. This technique enables the wires to be bundled or taped together in the regions where the paths of the wires are parallel and facilitates the maintenance of the respective ends of the various wires separate.

In a basic form of the invention there is provided a loom table which comprises two superposed layers of which the upper consists of a mesh which permits the partial insertion of shouldered pins. The lower layer includes a mesh and a resilient sheet which can releasably hold and laterally restrain the ends of pins which are pushed, for example by means of the automatic manipulator mentioned, partly through the aforementioned mesh. Such a table is more versatile than earlier proposals because with the aid of an automatic manipulator or a robot the pins may be laid out in any predetermined pattern, to define the paths along which the wires in the harness are to be laid and, at the end of a sequence of production of harnesses, the two layers can be relatively separated so as to release the pins from the table, the relative separation of the layers being preferably accompanied by an inversion of the table so that the pins fall from the table on to a conveyor whence they may be collected and fed back to a delivery point at which they can be picked up by an automatic manipulator when it is desired to set out a new array of pins.

A further improvement envisaged by the present invention consists of providing, instead of a two layer table, a three layer table which is likewise intended for use with shouldered pins and of which the upper layer is adapted for the easy passage of the pins, the intermediate layer is adapted to allow the partial passage of pins but to prevent, by cooperation with the shoulders of the pins, the complete passage of the pins through this layer, and of which the bottom layer comprises a resilient sheet as aforesaid for releasably holding the lower extremities of the pins and restraining them against lateral movement. The top layer can be raised relative to the intermediate layer to lift the completed harness away from the table at the completion of the laying of a harness.

Another aspect of the invention concerns an improved method of producing wiring harnesses including the use of a three layer table as already briefly described. The improved method preferably includes, for each wire that is to be laid, the steps of injecting the leading end of the wire into the layers, looping the wire around one of the guide pins, hereinafter called "start pin", laying the wire along a predetermined path defined by other guide pins and finally looping the wire around a final guide pin so that both ends of the wire are temporarily secured until the upper mesh layer is raised to release the wire from the pins. This method of temporarily securing the wire to the pins is very convenient and requires no special clips or attachments to the table such as are characteristic of the previous state of the art.

Preferably double ended pins are used and although the wire may be laid between pairs of pins and supported by upper shoulders thereof, a preferred form of the method includes the use of collars which are supported by the pins and provides spaced platforms for supporting the wires of the harness clear of the upper mesh.

BRIEF DESCRIPTION OF THE DRAWINGS

FIG. 1 is a plan view of one embodiment of a loom table according to the invention;

FIG. 2 is a side elevational view of the loom table of FIG. 1;

FIG. 5 illustrates schematically in side elevation a three layer loom table in accordance with the invention; and FIG. 6 illustrates a detail of a wiring method.

Figure 3:
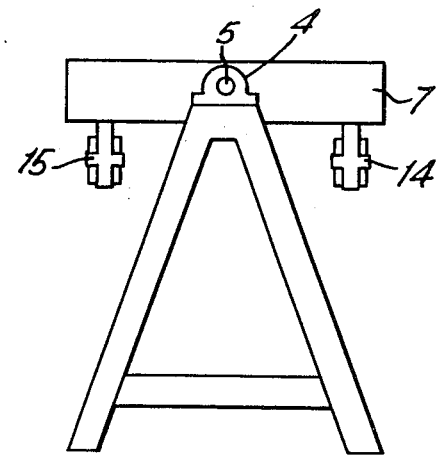
FIG. 3 is an end elevational view of the loom table of FIG. 1.

The loom 1 depicted by the first four Figures of the drawings comprises a rectangular table 2 mounted on a pair of A-shaped stands 3 for rotation about a horizontal axis. Other forms of stand can be used, for example H-shaped to provide for the mounting of equipment above the board.

A pair of trunnion bearings 4 supports the table by means of axially aligned stub shafts 5 projecting from opposite ends of the table. Mounted on one of the stands 3 is a rotary rack and pinion operated actuator 6, coupled to the respective shaft 5 to rotate the table 2 about the common axis of the two shafts between a working position as shown in the drawings and an inverted position rotationally displaced 180° from the working position; the purpose of such table inversion will be explained later herein.

The table 2 comprises a rectangular skirt support frame 7 comprising two side and two end members 8 and 9 respectively. Disposed within the support frame 7 are two mesh frames 10 and 11, one superposed above the other. The upper mesh frame 10 is fixed with respect to the support frame 7 at a position adjacent the upper rim of such frame 7. The lower frame 11, which is of slighter smaller dimensions than the upper frame 10, is in the working position shown, positioned beneath and immediately adjacent the upper frame 10.

Pairs of linear actuators 14 carried by respective brackets 15 fixed to and depending from the opposite end members 9 of the support frame are arranged to maintain the lower mesh frame in this disposition in the working position of the table but are actuable in the inverted position of the table to cause retraction of their respective piston rods 16 and consequently to effect a linear relative separation of the mesh frames, of which the lower one is connected to the said piston rods. The purpose of this separation will be made apparent hereinafter.

Figure 4:
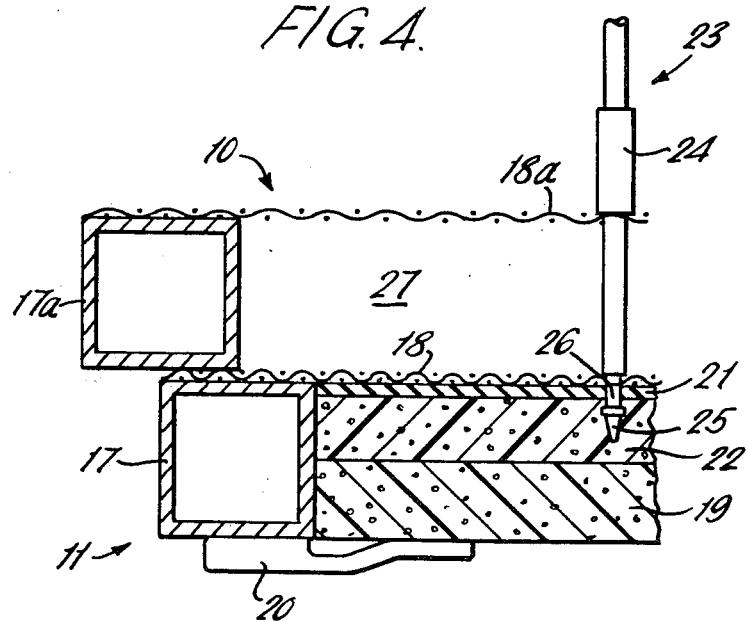
FIG. 4 is a vertical section through a part of the loom table of FIG. 1.

With reference to FIG. 4, each mesh frame comprises a rectangular framework 17, 17a made in this embodiment from square section tubing. Other sections, such as channel sections, may be used as an alternative. Across the top face of each framework is a rectangular perforated sheet 18, 18a of wire mesh. The framework 17a and mesh sheet 18a constitute the upper mesh frame whereas the lower mesh frame includes further elements disposed beneath the mesh sheet 18. Such elements comprise a rigid base board 19 held in place by retaining projections 20 projecting inwardly from the underside of the framework. Sandwiched between the base board 19 and the mesh sheet 18 are two superposed contiguous sheets 21 and 22. The upper sheet 21 of these two sheets is preferably made of polyurethane rubber or an appropriate substitute and is disposed immediately beneath the mesh sheet 18. The lower sheet 22 is made of a dense, natural or synthetic foam; polystyrene is generally suitable. The total thickness of the sheets 21 and 22 and the base board 19 is conveniently approximately equal to the dimensions of the framework 17 measured through the mesh frame.

The loom table 2 as described hereinbefore is intended to be used in conjunction with guide pins 23 having a shape as is partly shown in FIG. 4. The pins are double ended, that is to say they are symmetrical about a point midway along their length. The advantage of such pins is that a feeder which supplies the pins for handling by an automatic manipulator need not distinguish one end of a pin from the other. It would be possible to use asymmetric pins provided that a suitable bowl feeder or the like is used to present the pins correctly orientated to the manipulator.

Each pin 23 is of circular cross-section and comprises a central portion 24 of diameter greater than the aperture size of the mesh 18 so as to prevent such central portion passing through the mesh 18. The remainder of the pin, projecting on opposite sides of the central portion 24 has a diameter smaller than the aperture size of the mesh 18 and each end of the pin is formed with a conical head 25 and an adjacent annular groove 26. The length of each part of the pin between the central portion 24 and the respective groove 26 is preferably approximately equal to the distance between the two mesh sheets 18, 18a in the working position of the table.

The loom table described in FIGS. 1 to 4 may be used in the following manner for use in the production of wiring looms.

It is preferred to use an automatic manipulator which, as disclosed in my co-pending U.S. Pat. application Ser. No. 48,582 filed June 13th, 1979, now U.S. Pat. No. 4,348,805, withdraws guide pins from a supply thereof and places them at predetermined positions on the loom table. The construction and manner of operation of such a manipulator forms no part of the present invention. One of the aspects of the aforementioned U.S. Pat. No. 4,348,805 is the use of an automatic manipulator both to insert guide pins in the table by a simple pushing movement and also, preferably by using an interchangeable head, to lay the wires on the table. This expedient forms no part of the present invention but the loom table described herein is intended to be capable of use in such a method.

While the table 2 is maintained in its working position, the automatic manipulator takes hold of guide pins supplied by a feeder, one at a time, and places them at predetermined positions on the table. The placing is achieved by pushing the pin, which is held in an orientation according to which its axis extends normal to the plane of the mesh sheet 18a, downwards so that the lower end of the pin passes through an aperture in the upper mesh sheet 18a, through the space 27 between the two mesh sheets and through an aperture in the lower mesh sheet 18. The pin's end pierces the polyurethane sheet 21 and enters the foam sheet 22. The annular shoulder at the lower end of the central portion 24 of the pin then abuts the wire elements defining the aperture in the upper mesh sheet 18a through which the pin extends and the manipulator releases its grip upon the pin. The width of the groove 26, that is to say the dimension of the groove as measured along the pin is preferably greater than the thickness of the sheet 21 and the edge of the aperture produced as the pin pierces this layer can reflex into this groove to provide positive retention of the pin. This retention is enhanced by a gripping effect of the foam surrounding the head of the pin, the foam having been locally compressed upon entry of the pin head into the sheet 22. Accordingly, the pin is held relatively firmly in an upright position and is restrained against lateral movement.

The manipulator then proceeds to position a multiplicity of pins on the table to define the paths for the individual wires of the harnesses to be produced. It then proceeds with the production of the harnesses. As described in the aforementioned U.S. Pat. No. 4,348,805 wires may be cut and appropriately terminated, laid along the correct paths between the guide pins and temporarily taped together.

In order to remove the wiring harness from the loom table, the rotary actuator 6 is operated to invert the table whereupon the wiring harness falls from the table on to a moving conveyor or other appropriate receiving member. The table is then reinverted to the working position and another harness is wired.

After the assembly and ejection of the last wiring harness in a production run, the pins are removed from the table to prepare for the setting up of another pattern for a subsequent batch of harnesses. The pins are removed by means of the linear actuators 14 in the inverted position of the table so as to cause a relative separation of the mesh frames as aforesaid. This separation causes withdrawal of the pin heads from the lower mesh frame so as to cause the pins to fall under gravity on to the conveyor.

The resilience of the rubber sheet 21 and foam sheet 22 is such that after withdrawal of the pin heads the apertures produced as the pins were placed on the table tend to close and the gripping action upon the pins subsequently placed at precisely the same locations as before will be substantially unaffected.

FIGS. 5 and 6 illustrate an improved embodiment. The significance of this embodiment is the absence of any need for terminal fittings for securing the ends of the wires to the loom table, such as the blocks and such like mentioned in connection with the prior art. It should be remarked that it is possible, using the table shown in FIGS. 1 to 4, to secure the initial end of a wire temporarily to a given guide pin by looping it around the guide pin, an operation which is known per se from U.S. Pat. No. 4,030,526 of previous mention. However, a simple looping does not provide an entirely satisfactory anchorage; the table shown in FIGS. 5 and 6 can provide a more secure anchorage without requiring the use of special terminal fittings or terminal holders.

FIG. 5 illustrates a loom table 101 in simplified form. In practice the table may be a meter wide and two meters long. FIG. 5 is intended to illustrate also in greatly simplified form a completed laying operation for one wire.

The table 101 may be mounted in a manner similar to that illustrated by FIGS. 2 and 3 as previously described for the table 2; the modifications necessary, the table 101 being essentially a three layer table rather than a two layer table, will be readily apparent from the description which follows.

The table 101 comprises a rigid base board 102 which is carried in a frame 103 provided with clamps 104 for holding the base board 102 within the frame. The board 102 is overlain by a sheet 105 of readily penetrable material such as a dense, natural or synthetic foam, for example polystyrene. Over the sheet 105 is a sheet 106 which is intended to be penetrated by the guide pins but is capable of restraining lateral and upward movement of the pins. A suitable material for the sheet 106 is a silicone rubber. Above the sheet 106 is a steel wire mesh 107 which is carried by a frame 108 disposed around and slightly above the frame 103. Disposed above and somewhat separated from the mesh 107 is a second steel wire mesh 109 which is supported by a frame 110 extending around and disposed somewhat above the frame 108. Overlying the mesh 109 is a light mesh 111 of a resilient polymeric material such as "nylon" (Trade Mark). This mesh is secured to and supported by a frame 112 which extends around and is disposed slightly above the frame 110.

The table 101 is intended, like the table 2, for use in conjunction with guide pins such as the pins 113. These pins are similar to the guide pins previously mentioned and, as previously described, each comprise a central part 114 of slightly greater diameter than two shanks 115 extending one from each end of the central part 114. The step between each shank 115 and the central part 114 constitutes a shoulder. At each end the pin terminates in a respective head 116 separated from the shank 115 by a short narrow neck 117.

In this embodiment of the invention, double ended pins are preferably used for the reasons hereinbefore set forth but asymmetrical, single ended pins could be used. Nevertheless the pins 113 in the form shown in the drawings have the advantage that they can receive collars 118 each of which can be pushed over the upper head of a pin 113 so as to rest on the upper shoulder thereof. Such a collar is useful for pins which are to support a multiplicity of wires extending along the same general path.

At the commencement of a run of production of a multiplicity of wiring harnesses, an automatic manipulator will, as previously described, insert pins 113 in the table 101 in a predetermined array. Normally, for each wire in the array, there will be a respective start pin (113a), a respective final pin (113d) and intermediate pins, such as 113b and 113c of which there may be as many as necessary or suitable for the particular length of wire. Since the wires of the harness will over part of their length share a common path, then although over short lengths the wires can be supported by the upper shoulders of pins, it is preferable to dispose the collars 118 over intermediate pins. Preferably, along the path of a wire, pins are inserted in the table in pairs, side by side, the path of the respective wire or wires extending between the pins of each pair. Although, as mentioned hereinbefore, the automatic manipulator forms no part of the present invention, it is preferable to use a manipulator which can change its heads. For disposing the collars 118 over selected pins 113, the automatic manipulator may use a head which is in the form of a tube of annular cross-section, this tube being coupled when in place on the manipulator to a source of vacuum suction so that it can pick up a collar and deposit it over the head of the pin.

Subsequent to the deposition of collars on appropriate pins, the manipulator would change its head for a suitable wire laying tool. Such a tool forms no part of the present invention and various forms of tool could be used. One suitable form is disclosed in British Patent Application No. 8,109,427 filed Mar. 25th, 1981. The essential function of such a wire laying tool is that when it is held in a vertical position it can advance the leading end of a wire held therein forwardly of the tool and therefore in a downward direction. The significance of this will be soon apparent.

As has been mentioned, the wire mesh 109, in this embodiment of the invention constituting the intermediate layer, serves to limit the entry of the pins into the loom table and to facilitate their insertion to a constant depth. The bottom layer serves to restrain the pins against lateral movement.

Each wire laying operation preferably proceeds as follows.

A wire laying tool, such as the tool of previous mention, to which a metered length of wire 120 has been fed and which is preferably capable of advancing the length of the wire for a short distance from the lower tip of a probe extending forwardly of the tool, is brought adjacent and parallel to the start pin 113a. The tip of the probe of the tool is passed through the upper mesh 111 and into contact with the mesh 109. The wire in the tool is advanced to drive the leading part 119 of the wire through the meshes 111, 109 and 107 so that the wire is temporarily trapped. This trapping of the leading part of the wire affords it a temporary anchorage. The tool may then be rotated about the start pin 113a so as to produce a turn 121 of wire about the start pin. This turn or loop provides additional security for the anchorage of the wire 120. The tool, of which the probe is normally raised at some suitable time from a position close to the mesh 111 to a somewhat higher position, preferably to a height just above the top shoulders of the pins 113, is then maintained upright but traversed so as to lay the wire between the pairs of intermediate pins and over the collars 118 thereon in the predetermined path according to the programme which controls the automatic manipulator. Finally, the end of the wire 120 is by means of a movement similar to that required for producing the loop 121 traversed quickly around one of the final pair of pins 113d and 113e (FIG. 6) so as to produce a final loop 122 of the wire 120 around the pin 113d and is then passed between these pins, the final part of the wire thereby extending between these pins. This action prevents the unwinding of the final loop and would usually be necessary if the wire is springy.

The wire laying operation is repeated for each of the multiplicity of wires in the particular wiring harness.

At the termination of the laying of all the wires required for a particular harness, the manipulator preferably changes its wire laying tool for a tool which may be described in the (published) British Patent Application No. 8,014,054 or other tool which can apply securing tape at appropriate locations of the harness so as to bundle together those wires which share a common path. The bundling of the wires could be performed by hand but the use of a pneumatic tape applying tool is preferred.

After the various wires in the harness have been bundled together as desired and in accordance with the programme controlling the manipulator, the manipulator may be returned to a position in which it can change its tape applying tool for the collar placing tool which replaces the collars on the pins ready for the next harness.

In order to release the harness from the table, jacks coupled between the frames 110 and 112 (and schematically represented by the jack 123) are operated to cause mutual separation of the frames 110 and 112. This separation causes the mesh 111 to be raised relative to the mesh 109 by an amount sufficient to release the ends of the wires 120 from the meshes 111, 109 and 107 but less than the height of the collars 118 above the mesh 111 so that the mesh 111 does not foul the collars 118. Subsequently or simultaneously the table is inverted so that the harness can fall on to a conveyor. Reinversion of the table and the resetting of the jacks so as to restore the original relative positions of the meshes 111 and 109 renders the table ready for the production of the next harness in the batch.

The wiring of all the harnesses in a particular batch proceeds by repetition of the wire laying process which has been described. At the end of the batch, after the last harness has been removed, jacks coupled between the frames 108 and 110 (and schematically represented by the jack 124 are operated to cause separation of the frames 108 and 110 and thereby separation of the meshes 109 and 111 with respect to the lower layer constituted by the sheets 106 and the sheets associated therewith. Because the lower shoulders of the pins cannot pass through the mesh 109, the force of separation is sufficient to withdraw the lower heads of the pins from the sheet 106 and the mesh 107. The separation of the intermediate lower layers in this manner releases the pins from the table. Preferably the table is inverted before the intermediate and lower layers are relatively separated in order that the pins, when they are released, can fall on to the aforementioned conveyor.

The collars 118 can be removed from the pins 113 after each wire laying operation by the raising of the mesh 111 relative to the mesh 109 a sufficient amount to free the collars from the pins. If this expedient is adopted, the collars must be collected and fed back to a loading point so that they can by means of the appropriate tool be reinserted on the selected pins before each respective wire laying operation. Alternatively however the collars may be removed at the end of the last wire laying operation by a preliminary movement of the mesh 111 relative to the mesh 109.

Various modifications may, of course, be made to the work-table and it may be used in a manner other than that particularly described above.

I claim:

1. A wiring loom comprising a plurality of pins, each having end portions and an intermediate portion wider than the end portions, and a table adapted for receiving and releasably holding a plurality of said guide pins in a position to project on one side of the table at predetermined points thereon, the table comprising first and second superposed parallel layers of which said first layer has an array of apertures through which end portions but not intermediate portions of said pins can pass and of which said second layer is adapted to receive and inhibit lateral movement of end portions of the pins, whereby to hold each of said pins in position as aforesaid, and actuator means for effecting relative separation of said layers in a direction normal to said layers sufficient to release the end portions of the pins from the said second layer and effecting removal of the pins from the table.

2. A wiring loom according to claim 1, including means for inverting the table from a working position in which the said first layer is uppermost to an inverted position in which said second layer is uppermost to allow the pins to fall under gravity from the table when said layers are separated.

3. A wiring loom according to claim 1 wherein said first layer comprises a mesh work screen.

4. A wiring loom according to claim 3 wherein said second layer comprises a mesh.

5. A wiring loom according to claim 4 wherein said second layer further includes a first sheet of penetrable resilient material adjacent the mesh of the second layer, a relatively rigid base board and a second sheet of foamed material between said board and said first sheet.

6. A wiring loom according to claim 5 in which said first sheet comprises rubber and said second sheet comprises polystyrene.

7. A wiring loom according to claim 4, including a peripheral support frame enclosing first and second frameworks, said first framework supporting said first layer and said second framework supporting said second layer, said first framework being fixed relative to the support frame, and further comprising linear actuators constituting said actuator means and mounted on said support frame and coupled to said second framework.

8. An assemblage comprising a plurality of guide pins and a loom table for receiving and releasably holding said pins in position to project on one side of said table at predetermined points thereon, each guide pin comprising a first portion terminating at a tapered end of the pin and having a second, wider portion forming a shoulder with said first portion, the table comprising first and second superposed parallel layers of which said first layer comprises an array of apertures through which said first portions of said pins can pass and of which said second layer is adapted to receive and inhibit lateral movement of said ends of the pins, whereby to hold each pin in position as aforesaid, and actuator means for effecting relative separation of said layers in a direction normal to the layers by an amount sufficient to release the ends of the pins from said second layer whereby said pins are removed from the table, the said wider portion of each pin being wider than said apertures whereby to limit the extent to which the pin can penetrate the table.

9. An assemblage according to claim 8 wherein each pin is double ended, having two of said first portions extending from a wider central portion.

10. An assemblage according to claim 9, wherein said first layer comprises a mesh.

11. An assemblage according to claim 10 in which said second layer comprises a second mesh, a first layer of penetrable resilient material adjacent said second mesh, a rigid base board and a second sheet of foamed material between said base board and said first sheet.

12. An assemblage according to claim 11 wherein said first sheet comprises rubber and said second sheet comprises polystyrene.

13. An assemblage according to claim 8, further comprising means for inverting the table whereby said pins can fall from the table when said first and second layers are relatively separated from one another.

14. In apparatus for use in the production of wiring looms including a plurality of shouldered guide pins, an improved loom table for receiving and releasably holding a plurality of guide pins in position to project on one side of the board at predetermined points thereon, said table comprising first and second superposed parallel layers, said first layer comprising a mesh permitting partial passage of said pins through apertures in said mesh and cooperating with the shoulders of the pins to prevent total passage of the pins therethrough and said second layer including at least one sheet of resilient material adapted to be penetrated by the end portions of the pins so as to inhibit lateral movement of the pins and to hold releasably the pins in place, said second layer also including a rigid backing board disposed on the opposite side of the resilient layer from said pins, and actuator means for effecting relative separation of the first and second layers in a direction normal thereto so as to effect release of the pins from the said second layer.

15. Apparatus for use in the production of wiring looms and for use in conjunction with a multiplicity of shouldered guide pins each having an end portion and an intermediate portion wider than the said end portion, the apparatus comprising a loom table for receiving and releasably holding a plurality of guide pins in position such that said pins project on one side of the table, the table comprising an upper, intermediate and lower superposed parallel layers, said upper layer permitting the passage of said pins therethrough and being adapted for the entry of wire, the intermediate layer permitting partial passage of said pins and passage of the wire through it but cooperating with the intermediate portions of the pins to prevent complete passage of the pins through it, and said lower layer including at least one sheet of resilient material adapted to be penetrated by the end portions of the pins so as to releasably hold the pins in place and to inhibit lateral movement of the pins, and actuator means for effecting relative separation of the upper layer from the intermediate layer in a direction normal to the layers, and actuator means for effecting relative separation of the upper and intermediate layers relative to the lower layer whereby to release the end portions of the pins from the lower layer.

16. Apparatus according to claim 15 in which the said upper layer is a mesh of resiliently flexible material.

17. Apparatus according to claim 15 in which the intermediate layer comprises a metallic mesh.

18. Apparatus according to claim 15 in which the lower layer comprises the said sheet of resilient material overlaid by a relatively rigid mesh.

19. Apparatus according to claim 18 in which the lower layer comprises a rigid backing board, overlaid by a sheet of penetrable material itself overlaid by the said sheet of resilient material.

20. Apparatus for use in the production of wiring looms, said apparatus comprising a multiplicity of shouldered guide pins, each pin comprising a central portion of greater thickness than two shanks extending from opposite sides of the central portion and defining a respective shoulder with said central portion, a loom table for receiving and releasably holding a plurality of said guide pins in position such that the pins project on one side of the table, said table comprising an upper layer constituted by a mesh of resiliently flexible material, an intermediate layer constituted by a metallic mesh, and a lower layer including a sheet of resilient material adapted to be penetrated by the pins so as to releasably hold the pins in place and to inhibit lateral movement of the pins, said metallic mesh permitting the passage of said shanks of said pins but preventing the passage of the central portions of said pins, and actuator means for effecting relative separations of the upper layer from the intermediate layer in a direction normal thereto, and actuator means for effecting relative separation of the upper and intermediate layers relative to the lower layer whereby to release the pins from said lower layer.

21. Apparatus according to claim 20, in combination with a multiplicity of resilient collars adapted for disposition on said pins.

22. A method of wiring a multiplicity of harnesses, comprising the steps of:
   (1) mechanically inserting a multiplicity of shouldered pins in a predetermined pattern on a loom table which comprises three superposed layers of which the uppermost is a mesh, the intermediate layer is a layer permitting the partial but not the complete passage of said pins and the lowermost is penetrable by said pins and is adapted to hold said pins releasably and inhibit lateral movement thereof;
   (2) mechanically executing, for each harness, a multiplicity of wiring operations, each wiring operation comprising injecting the leading end of a length of wire into at least the uppermost and intermediate layers whereby it is ensnared;
   (3) looping a part of said wire adjacent the leading end thereof around a first one of said pins;
   (4) laying the wire along a predetermined path defined by others of said pins;
   (5) looping the trailing end of said wire around a particular one of said pins;
   (6) separating said uppermost layer from the intermediate layer in a direction normal to these two layers so as to release the harness from the layers; and
   (7) removing said harness from the table.

23. A method according to claim 22 comprising after said step (7) the further steps of:
   (8) subsequently replacing the uppermost layer relative to the intermediate layer; and subsequent to the production of a multiplicity of similar harnesses, the further step of:
   (9) separating the uppermost and intermediate layers from the lower layer in a direction normal to the layers to release the pins from the loom table.

24. A method according to claim 22, further comprising disposing collars on said pins and wherein the step of laying the wire includes laying part of the wire such that the wire is supported by selected ones of the said collars.

25. A method according to claim 22, including the step of binding at least some of the wires in each harness together at selected locations before the wire is released from said table.

* * * * *